United States Patent
Hudler

(10) Patent No.: US 9,193,237 B2
(45) Date of Patent: Nov. 24, 2015

(54) METHOD OF PRODUCING A CHASSIS CONTROL ARM, AND CONTROL ARM FOR A VEHICLE

(71) Applicant: Audi AG, Ingolstadt (DE)

(72) Inventor: Roland Hudler, Manching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/173,537

(22) Filed: Feb. 5, 2014

(65) Prior Publication Data

US 2014/0225343 A1 Aug. 14, 2014

(30) Foreign Application Priority Data

Feb. 14, 2013 (DE) .......................... 10 2013 002 590

(51) Int. Cl.
*B60G 7/00* (2006.01)
*B23P 11/00* (2006.01)
(Continued)

(52) U.S. Cl.
CPC ............. *B60G 7/001* (2013.01); *B23P 11/005* (2013.01); *B60G 7/00* (2013.01); *B60G 7/02* (2013.01); *F16C 7/08* (2013.01); *F16F 1/3849* (2013.01); *B21D 15/06* (2013.01); *B21D 39/06* (2013.01); *B21D 53/88* (2013.01); *B23P 2700/14* (2013.01); *B60G 2206/017* (2013.01); (Continued)

(58) Field of Classification Search
CPC ............ B60G 7/001; B60G 7/02; B60G 7/00; B60G 2206/8208; B60G 2206/82; B60G 2206/8209; B60G 2206/14; B60G 2206/017; B60G 2206/10; B60G 2206/722; F16C 7/08; F16C 2326/05; B21D 15/05; B21D 39/06; B21D 53/88; B23P 11/005; B23P 2700/14

USPC ................ 280/124.125, 124.121, 124.124, 280/124.135, 124.138, 124.134, 124.177; 267/141.7; 188/67; 403/228; 29/897.2
See application file for complete search history.

(56) References Cited

U.S. PATENT DOCUMENTS 1,943,631 A 1/1934 Skillman
3,121,348 A 2/1964 Reed
(Continued)

FOREIGN PATENT DOCUMENTS

CN 101659184 3/2010
DE 25 24 536 12/1976
(Continued)

OTHER PUBLICATIONS

Chinese Search Report issued in counterpart Chinese patent application No. 201410051651.3 on Aug. 5, 2015.
(Continued)

*Primary Examiner* — Paul N Dickson
*Assistant Examiner* — Darlene P Condra
(74) *Attorney, Agent, or Firm* — Henry M. Feiereisen LLC

(57) ABSTRACT

In a method of producing a chassis control arm, at least one end of a blank is provided with at least two webs which are arranged in spaced-apart relation and define a clearance therebetween. Each of the webs is formed with a bearing opening, with the bearing opening of one web and the bearing opening of the other web aligned in coaxial relation to provide a bearing zone. A bearing sleeve is placed into the bearing openings, and the bearing sleeve is peripherally expanded at least in one region such as to project radially into the clearance. The at least one peripheral expansion can be formed to directly abut at least one of the webs in an axial direction.

22 Claims, 3 Drawing Sheets

(51) Int. Cl.
  *B60G 7/02* (2006.01)
  *F16C 7/08* (2006.01)
  *F16F 1/38* (2006.01)
  *B21D 39/06* (2006.01)
  *B21D 53/88* (2006.01)
  *B21D 15/06* (2006.01)

(52) U.S. Cl.
  CPC ........ *B60G 2206/10* (2013.01); *B60G 2206/14* (2013.01); *B60G 2206/16* (2013.01); *B60G 2206/722* (2013.01); *B60G 2206/82* (2013.01); *B60G 2206/8208* (2013.01); *B60G 2206/8209* (2013.01); *F16C 2326/05* (2013.01); *Y10T 29/49622* (2015.01)

(56) References Cited

U.S. PATENT DOCUMENTS

| | | | | |
|---|---|---|---|---|
| 3,471,164 | A * | 10/1969 | Tyerman | 280/124.141 |
| 4,405,256 | A * | 9/1983 | King, Jr. | 403/408.1 |
| 4,637,628 | A * | 1/1987 | Perkins | 280/124.106 |
| 4,656,721 | A | 4/1987 | Werner | |
| 5,413,374 | A * | 5/1995 | Pierce | 280/124.177 |
| 7,571,917 | B2 | 8/2009 | Ruehe et al. | |
| 8,616,570 | B2 | 12/2013 | Mielke et al. | |
| 2006/0290040 | A1 | 12/2006 | Kumper | |
| 2009/0202184 | A1 * | 8/2009 | Franke et al. | 384/220 |
| 2011/0033230 | A1 | 2/2011 | Brunneke et al. | |
| 2011/0198821 | A1 * | 8/2011 | Hessing et al. | 280/124.134 |
| 2011/0314676 | A1 * | 12/2011 | James | 29/898.055 |
| 2012/0292875 | A1 * | 11/2012 | Koide et al. | 280/124.153 |
| 2012/0299263 | A1 * | 11/2012 | Mielke et al. | 280/124.134 |
| 2013/0328283 | A1 * | 12/2013 | Korte et al. | 280/124.134 |

FOREIGN PATENT DOCUMENTS

| | | |
|---|---|---|
| DE | 85 34 710 | 3/1986 |
| DE | 90 06 777 | 10/1990 |
| DE | 43 34 230 | 1/1995 |
| DE | 102005029614 | 1/2007 |
| DE | 102005033810 | 1/2007 |
| DE | 102008013182 | 9/2009 |
| DE | 102008001157 | 11/2009 |
| DE | 102009025429 | 1/2011 |
| DE | 102010051741 | 5/2012 |
| EP | 1 329 343 | 7/2003 |
| FR | 2 277 967 | 2/1976 |
| JP | 8-233009 | 9/1996 |

OTHER PUBLICATIONS

English translation of Chinese Search Report issued in counterpart Chinese patent application No. 201410051651.3 on Aug. 5, 2015.

* cited by examiner

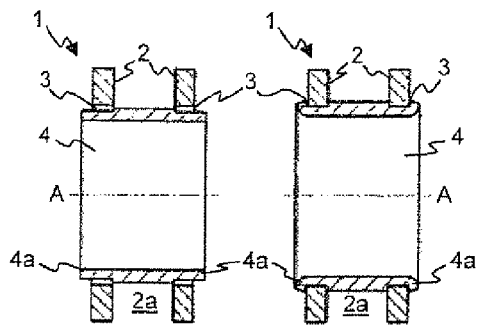
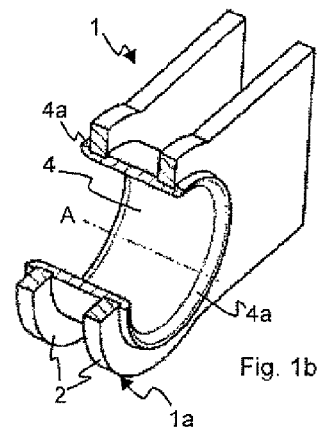
Fig. 1    Fig. 1a    Fig. 1b
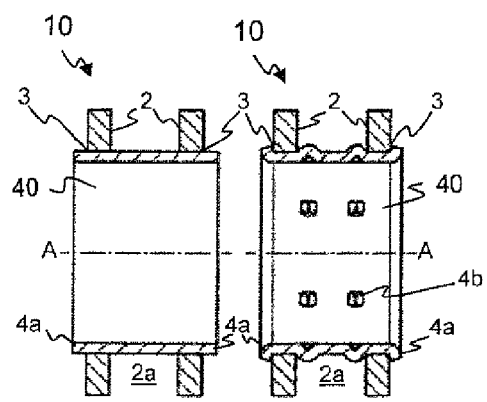
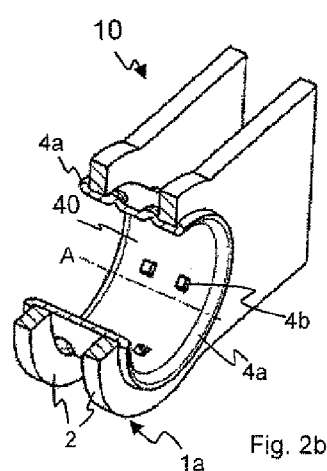
Fig. 2    Fig. 2a    Fig. 2b
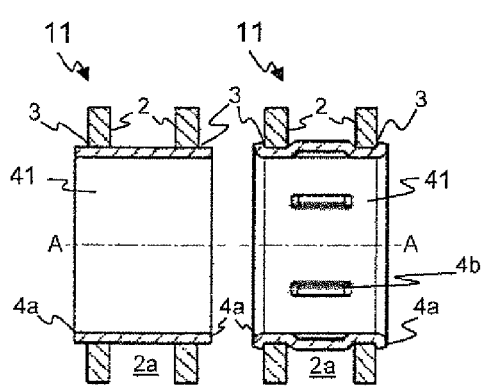
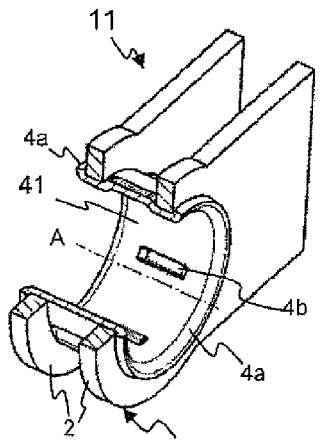
Fig. 3    Fig. 3a    Fig. 3b

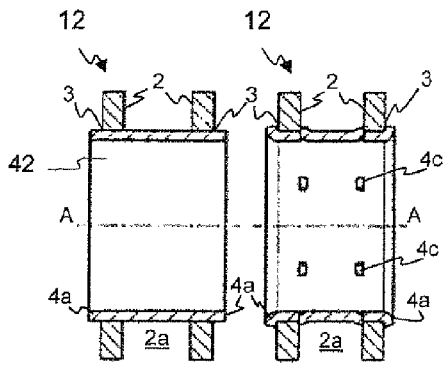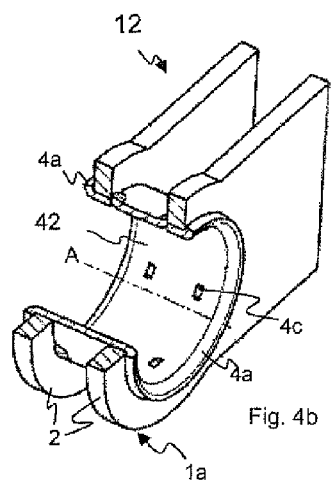
Fig. 4    Fig. 4a    Fig. 4b
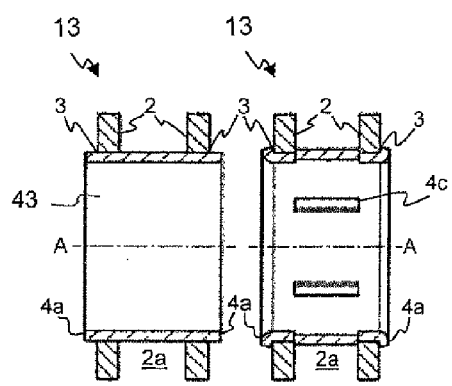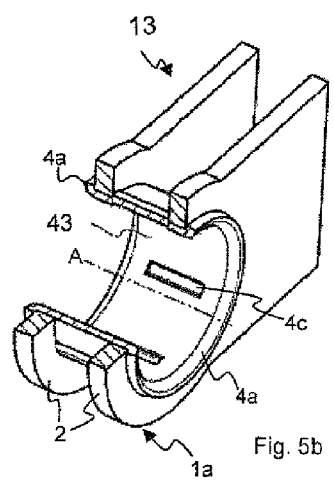
Fig. 5    Fig. 5a    Fig. 5b
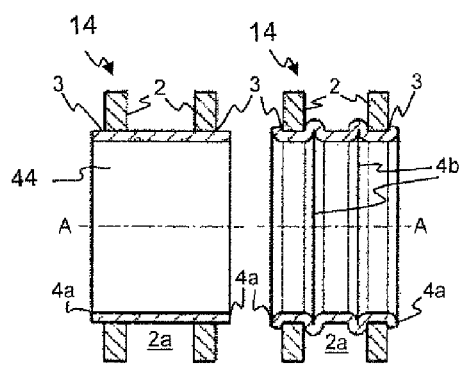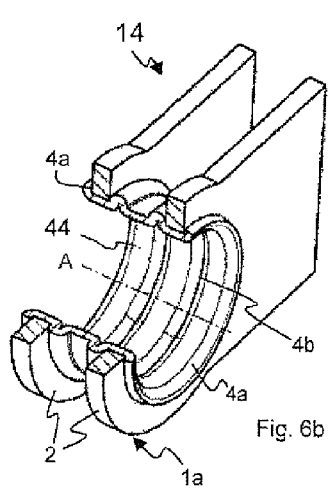
Fig. 6    Fig. 6a    Fig. 6b

METHOD OF PRODUCING A CHASSIS CONTROL ARM, AND CONTROL ARM FOR A VEHICLE

CROSS-REFERENCES TO RELATED APPLICATIONS

This application claims the priority of German Patent Application, Serial No. 10 2013 002 590.7, filed Feb. 14, 2013, pursuant to 35 U.S.C. 119(a)-(d), the disclosure of which is incorporated herein by reference in its entirety as if fully set forth herein.

BACKGROUND OF THE INVENTION

The present invention relates to a method of producing a chassis control arm for use in a vehicle.

The following discussion of related art is provided to assist the reader in understanding the advantages of the invention, and is not to be construed as an admission that this related art is prior art to this invention.

A chassis control arm, also referred to as transverse link or simply control arm, finds application in the automotive industry as part of the wheel suspension to connect the wheel with the vehicle body and to ensure a guiding of the wheel with certain degrees of freedom. The control arm is provided with a bearing for swingable securement of the control arm to the body or to a wheel carrier. Control arms of this type may be made from blanks of formed steel sheets or formed extrusion profiles and are provided with bearing openings for receiving a bearing, for example a rubber-metal bearing, via which the control arm is connected to a wheel carrier or body or subframe of a vehicle.

It would be desirable and advantageous to provide an improved method of producing a chassis control arm and to provide a chassis control arm to obviate prior art shortcomings and to ensure a lastingly firm seat of the bearing.

SUMMARY OF THE INVENTION

According to one aspect of the present invention, a method of producing a chassis control arm includes the steps of providing an end of a blank with at least two webs in spaced-apart relation to define a clearance there between, forming each of the webs with a bearing opening, with the bearing opening of one web and the bearing opening of the other web aligned in coaxial relation to provide a bearing zone, placing a bearing sleeve into the bearing openings, and peripherally expanding at least one region of the bearing sleeve to form at least one peripheral expansion sized to project radially into the clearance.

According to another advantageous feature of the present invention, the at least one peripheral expansion can be sized to directly abut at least one of the webs in an axial direction.

The present invention resolves prior art problems by providing the bearing sleeve, received by the coaxial bearing openings in the webs of the control arm, with one or more regions that have been peripherally expanded to form one or more peripheral expansion which project radially into the clearance between the webs and may directly abut at least one of the webs in an axial direction. As a result, the securement of the bearing sleeve in the control arm is significantly improved. A deformation of the webs when exposed to stress is effectively countered by the peripheral expansion. By varying the number, geometric configuration or spatial arrangement of peripheral expansions, the firm seat of the bearing sleeve can be positively affected in any desired manner. The bearing sleeve can still be formed in its initial state in a simple manner and thus is cost-effectively to produce because the fit of the bearing sleeve is realized by a simple additional forming process, after the bearing sleeve has been placed in the bearing openings.

According to another advantageous feature of the present invention, the bearing sleeve has at least one end which can be bent or collared and which projects beyond an adjacent one of the webs. By collaring at least one end of the bearing sleeve before or after the peripheral expansion, a collar is formed which abuts on the associated web in axial direction. The presence of such a collar further enhances the firm seating of the bearing sleeve as the webs are further stabilized to resist deformation as a result of a limitation of further degrees of freedom. Advantageously, collaring of the axial end or ends of the bearing sleeve is implemented while the bearing sleeve is peripherally expanded so as to shorten the time period for carrying out the overall manufacturing process.

According to another advantageous feature of the present invention, the bearing openings can each be formed by a stamping process or boring process. In this way, the coaxial bearing openings can be made especially easily by a single operating step.

According to another advantageous feature of the present invention, the at least one region of the bearing sleeve has a diameter which can be greater than a remaining region of the bearing sleeve, with the circumferential expansion of the bearing sleeve extending about the bearing sleeve over its entirety. As a result, the bearing sleeve has a stepped configuration to define a middle section which has the greater diameter which is still smaller in the initial state than the diameter of the bearing openings. Only after undergoing the peripheral expansion does the diameter of the entire bearing sleeve increase so that the middle section of the bearing sleeve is able to partly project into the clearance and can no longer be removed from the bearing openings.

According to another advantageous feature of the present invention, the bearing sleeve can be peripherally expanded in the at least one region radially about an entire circumference or intermittently. When the peripheral expansion of the bearing sleeve is intermittent, only certain regions of the bearing sleeve or certain distances between peripheral expansions are involved, whereas a radial peripheral expansion forms a closed ring.

According to another advantageous feature of the present invention, each of the webs can form a form fit with the bearing sleeve, when the at least one region is peripherally expanded and the at least one end is collared. As a result, at least one of the webs is contacted on one side with the bearing sleeve, thereby reducing an axial play to a minimum. Of course, if both ends of the bearing sleeve are collared, both webs are contacted on respective sides with the bearing sleeve.

According to another advantageous feature of the present invention, the provision of the peripheral expansion may be realized by inserting an expanding mandrel in the bearing sleeve. The expanding mandrel may radially spread apart, at least in part, to thereby shape the bearing sleeve accordingly.

According to another aspect of the present invention, a chassis control arm includes a bearing zone having at least two webs in spaced-apart relation to define a clearance there between, each of the webs having a bearing opening, with the bearing opening of one web and the bearing opening of the other web aligned in coaxial relation, and a bearing sleeve received in the bearing openings and having at least one region which is peripherally expanded to form at least one peripheral expansion sized to project radially into the clearance. At least one peripheral expansion can be formed to directly abut at least one of the webs in an axial direction.

According to another advantageous feature of the present invention, the bearing sleeve may have a tubular configuration.

According to another advantageous feature of the present invention, the at least one region of the bearing sleeve has a diameter which can be greater than a remaining region of the bearing sleeve.

According to another advantageous feature of the present invention, the at least one region of the bearing sleeve can have a fold. The term "fold" is hereby to be understood as relating to a peripheral expansion realized solely through material deformation absent any material breaking. A fold is thus characterized by a curved cross-sectional profile.

According to another advantageous feature of the present invention, the at least one region of the bearing sleeve can have an elevation. The term "elevation" is hereby to be understood as relating to a peripheral expansion realized through material deformation with accompanying (partial) material breaking. An elevation is thus characterized by a sudden cross-sectional profile.

According to another advantageous feature of the present invention, the elevation or the fold can extend in axial or radial extension of the bearing sleeve. When extending in axial direction, the elevation or the fold contacts both webs simultaneously. To provide a firmer seating or fit, several of such elevations or folds can be arranged about the radial circumference of the bearing sleeve. When extending in radial direction, the elevation or the fold contacts one of the webs, with several of such elevations or folds being dispersed about the radial circumference of the bearing sleeve. To provide a firmer seating or fit, the axially confronting web is formed with complementary elevations of folds.

According to yet another aspect of the present invention, a vehicle includes a chassis control arm which includes a bearing zone having at least two webs arranged in spaced-apart relation and defining a clearance there between, each of the webs having a bearing opening, with the bearing opening of one web and the bearing opening of the other web aligned in coaxial relation, and a bearing sleeve received in the bearing openings and having at least one region which is peripherally expanded to form at least one peripheral expansion sized to project radially into the clearance. At least one peripheral expansion can be formed to directly abut at least one of the webs in an axial direction

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a sectional view of a method step for producing a first embodiment of a chassis control arm;

FIG. 1a is a sectional view of another method step for producing the first embodiment of the chassis control arm;

FIG. 1b is an isometric, partly sectional illustration of the first embodiment of the chassis control arm;

FIG. 2 is a sectional view of a method step for producing a second embodiment of a chassis control arm;

FIG. 2a is a sectional view of another method step for producing the second embodiment of the chassis control arm;

FIG. 2b is an isometric, partly sectional illustration of the second embodiment of the chassis control arm;

FIG. 3 is a sectional view of a method step for producing a third embodiment of a chassis control arm;

FIG. 3a is a sectional view of another method step for producing the third embodiment of the chassis control arm;

FIG. 3b is an isometric, partly sectional illustration of the third embodiment of the chassis control arm;

FIG. 4 is a sectional view of a method step for producing a fourth embodiment of a chassis control arm;

FIG. 4a is a sectional view of another method step for producing the fourth embodiment of the chassis control arm;

FIG. 4b is an isometric, partly sectional illustration of the fourth embodiment of the chassis control arm;

FIG. 5 is a sectional view of a method step for producing a fifth embodiment of a chassis control arm;

FIG. 5a is a sectional view of another method step for producing the fifth embodiment of the chassis control arm;

FIG. 5b is an isometric, partly sectional illustration of the fifth embodiment of the chassis control arm;

FIG. 6 is a sectional view of a method step for producing a sixth embodiment of a chassis control arm;

FIG. 6a is a sectional view of another method step for producing the sixth embodiment of the chassis control arm;

FIG. 6b is an isometric, partly sectional illustration of the sixth embodiment of the chassis control arm;

DETAILED DESCRIPTION OF PREFERRED EMBODIMENTS

Figures 7A, 7B:
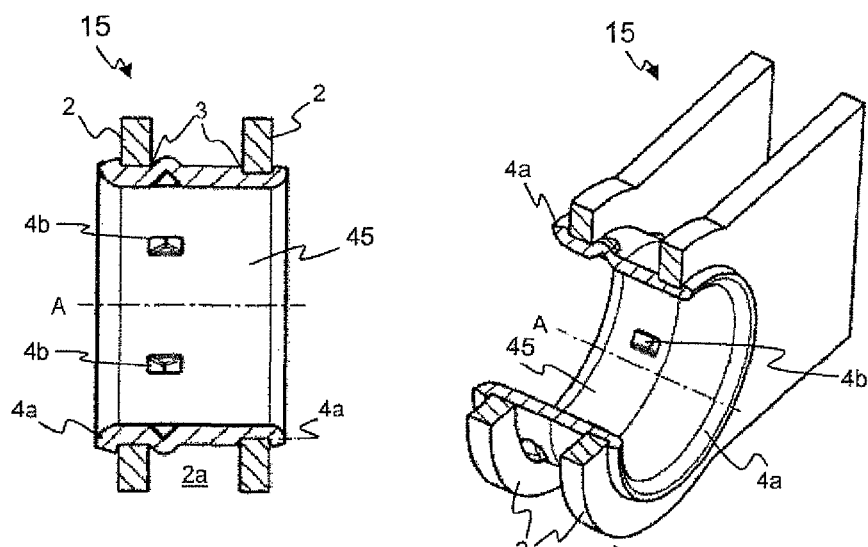
FIG. 7a is a sectional view of a method step for producing a seventh embodiment of a chassis control arm.
FIG. 7b is an isometric, partly sectional illustration of the seventh embodiment of the chassis control arm.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1 and 1a, there are shown sectional views of two method steps for producing a first embodiment of a chassis control arm, generally designated by reference numeral 1 and having two webs 2 extending in parallel, spaced-apart relationship to define a clearance 2a. FIG. 1 shows a method step in which a blank is provided with the webs 2, with the webs 2 having each a bearing opening 3, with both bearing openings 3 of the webs 2 arranged in coaxial relationship to form a bearing zone 1a. Placed in an axial direction A in the bearing openings 3 with play is a bearing sleeve 4 which is formed as a tubular member. The bearing sleeve 4 has a stepped diameter to define a middle section which is associated to the clearance 2a, and side sections which adjoin the middle section, respectively. The middle section has a diameter which is greater than a diameter of the side sections. In a next method step, shown in FIG. 1a, the bearing sleeve 4 undergoes in the middle section a peripheral expansion about its circumference so that the middle section projects into the clearance 2a between the webs 2. The axial extension of the middle section substantially corresponds to the axial extension of the clearance 2a. As further shown in FIG. 1a and also in FIG. 1b, the bearing sleeve 4 has ends 4a which are bent or collared to provide the bearing sleeve 4 overall with a firm form fit with the webs 2.

FIGS. 2 and 2a show sectional views of two method steps for producing a second embodiment of a chassis control arm, generally designated by reference numeral 10 and having two webs 2 extending in parallel, spaced-apart relationship to define clearance 2a. Parts corresponding with those in FIGS. 1, 1a are denoted by identical reference numerals. FIG. 2 shows a method step in which a blank is provided with the webs 2, with the webs 2 having each a bearing opening 3, with both bearing openings 3 of the webs 2 arranged in coaxial relationship to form bearing zone 1a. Placed in an axial direction A in the bearing openings 3 is a bearing sleeve 40 which is formed as a tubular member of constant diameter. FIGS. 2a and 2b show the bearing sleeve 40 after undergoing a peripheral expansion which here is only realized in some regions. Small folds 4b are formed in spaced-apart relation at specific angular distances about the radial circumference of the bearing sleeve 40 to project into the clearance 2a between the webs 2 in immediate axial proximity to the webs 2. As further shown in FIGS. 2a, 2b, the two ends 4a of the bearing sleeve 40 are bent or collared to provide the bearing sleeve 40 overall with a firm form fit with the webs 2.

FIGS. 3 and 3a show sectional views of two method steps for producing a third embodiment of a chassis control arm, generally designated by reference numeral 11 and having two webs 2 extending in parallel, spaced-apart relationship to define clearance 2a. Parts corresponding with those in FIGS. 1, 1a are denoted by identical reference numerals. FIG. 3 shows a method step in which a blank is provided with the webs 2, with the webs 2 having each a bearing opening 3, with both bearing openings 3 of the webs 2 arranged in coaxial relationship to form bearing zone 1a. Placed in an axial direction A in the bearing openings 3 is a bearing sleeve 41 which is formed as a tubular member of constant diameter. FIGS. 3a and 3b show the bearing sleeve 41 after undergoing a peripheral expansion which here is only realized in some regions. Small folds 4b are formed in spaced-apart relation at specific angular distances about the radial circumference of the bearing sleeve 41 and axially project across the clearance 2a between the webs 2. As further shown in FIGS. 3a, 3b, the two ends 4a of the bearing sleeve 41 are bent or collared to provide the bearing sleeve 41 overall with a firm form fit with the webs 2.

FIGS. 4 and 4a show sectional views of two method steps for producing a fourth embodiment of a chassis control arm, generally designated by reference numeral 12 and having two webs 2 extending in parallel, spaced-apart relationship to define clearance 2a. Parts corresponding with those in FIGS. 1, 1a are denoted by identical reference numerals. FIG. 4 shows a method step in which a blank is provided with the webs 2, with the webs 2 having each a bearing opening 3, with both bearing openings 3 of the webs 2 arranged in coaxial relationship to form bearing zone 1a. Placed in an axial direction A in the bearing openings 3 is a bearing sleeve 42 which is formed as a tubular member of constant diameter. FIGS. 4a and 4b show the bearing sleeve 42 after undergoing a peripheral expansion which here is only realized in some regions. Small elevations 4c are formed in spaced-apart relation at specific angular distances about the radial circumference of the bearing sleeve 42 to project into the clearance 2a in immediate axial proximity to the webs 2 and to bear with their breaklines upon the webs 2. As further shown in FIGS. 4a, 4b, the two ends 4a of the bearing sleeve 42 are bent or collared to provide the bearing sleeve 42 overall with a firm form fit with the webs 2.

FIGS. 5 and 5a show sectional views of two method steps for producing a fifth embodiment of a chassis control arm, generally designated by reference numeral 13 and having two webs 2 extending in parallel, spaced-apart relationship to define clearance 2a. Parts corresponding with those in FIGS. 1, 1a are denoted by identical reference numerals. FIG. 5 shows a method step in which a blank is provided with the webs 2, with the webs 2 having each a bearing opening 3, with both bearing openings 3 of the webs 2 arranged in coaxial relationship to form bearing zone 1a. Placed in an axial direction A in the bearing openings 3 is a bearing sleeve 43 which is formed as a tubular member of constant diameter. FIGS. 5a and 5b show the bearing sleeve 43 after undergoing a peripheral expansion which here is only realized in some regions. Small elevations 4c are formed in spaced-apart relation at specific angular distances about the radial circumference of the bearing sleeve 43 and sized to extend axially between the webs 2 across the clearance 2a, with lateral breaklines respectively bearing upon the webs 2. As further shown in FIGS. 5a, 5b, the two ends 4a of the bearing sleeve 43 are bent or collared to provide the bearing sleeve 43 overall with a firm form fit with the webs 2.

FIGS. 6 and 6a show sectional views of two method steps for producing a sixth embodiment of a chassis control arm, generally designated by reference numeral 14 and having two webs 2 extending in parallel, spaced-apart relationship to define clearance 2a. Parts corresponding with those in FIGS. 1, 1a are denoted by identical reference numerals. FIG. 6 shows a method step in which a blank is provided with the webs 2, with the webs 2 having each a bearing opening 3, with both bearing openings 3 of the webs 2 arranged in coaxial relationship to form bearing zone 1a. Placed in an axial direction A in the bearing openings 3 is a bearing sleeve 44 which is formed as a tubular member of constant diameter. FIGS. 6a and 6b show the bearing sleeve 44 after undergoing a peripheral expansion which here extends radially all-around to form two folds 4b. The provision of such a peripheral expansion in the form of folds 4b can be assisted by compressing the bearing sleeve 44 in the axial direction A. Each of the circumferential folds 4b projects into the clearance 2a in immediate proximity to the webs 2. As further shown in FIGS. 6a, 6b, the two ends 4a of the bearing sleeve 44 are bent or collared to provide the bearing sleeve 44 overall with a firm form fit with the webs 2.

FIG. 7a shows a sectional view of a method step for producing a seventh embodiment of a chassis control arm, generally designated by reference numeral 15 and having two webs 2 extending in parallel, spaced-apart relationship to define clearance 2a. Parts corresponding with those in FIG. 1 are denoted by identical reference numerals. FIG. 7a shows a method step in which a blank is provided with the webs 2, with the webs 2 having each a bearing opening 3, with both bearing openings 3 of the webs 2 arranged in coaxial relationship to form bearing zone 1a. One of the two bearing openings 3 has a diameter which is greater than a diameter of the other one of the bearing openings 3. By way of example, the bearing opening 3 on the left-hand side is greater than the diameter of the bearing opening 3 on the right-hand side of FIG. 7a. Placed in an axial direction A in the bearing openings 3 is a bearing sleeve 44 that has undergone a peripheral expansion which here is realized only in some regions. The bearing sleeve 45 has a stepped configuration to define one section having a diameter in correspondence with the bearing opening 3 of greater diameter and another section having a diameter in correspondence with the bearing opening 3 of smaller diameter. The bearing sleeve 45 is inserted from the web 2 with the greater bearing opening 3 until the bearing sleeve 45 axially impacts the web 2 with the smaller bearing opening 3. The peripheral expansion is realized in some regions for the web 2 with greater bearing opening 3, with small folds 4b being formed in spaced-apart relation at specific angular distances about the radial circumference of the bearing sleeve 45 and projecting into the clearance 2a in immediate axial proximity to the webs 2. As further shown in FIGS. 7a and 7b, the two ends 4a of the bearing sleeve 45 are bent or collared to provide the bearing sleeve 41 overall with a firm form fit with the webs 2.

Figure 8:
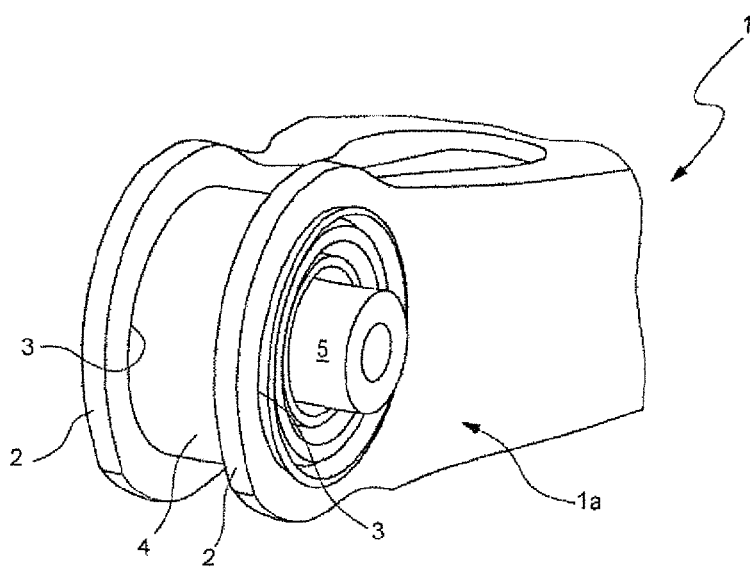
FIG. 8 is an isometric illustration of a chassis control arm with press-fitted bearing.

FIG. 8 shows by way of example and representative for any of the chassis control arms 1, 10, 11, 12, 13, 14, 15 an isometric illustration of the chassis control arm 1 after its bearing sleeve 4 has undergone the peripheral expansion. After peripheral expansion, a bearing 5 can be press-fitted into the bearing sleeve 4 for use as swingable securement of the chassis control arm 1 to respective components of a vehicle (not shown).

While the invention has been illustrated and described in connection with currently preferred embodiments shown and described in detail, it is not intended to be limited to the details shown since various modifications and structural changes may be made without departing in any way from the spirit and scope of the present invention. For example any combinations of afore-described embodiments are conceivable within the scope of the invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of producing a chassis control arm, comprising the steps of:
   providing an end of a blank with at least two webs in spaced-apart relation to define a clearance there between;
   forming each of the webs with a bearing opening, with the bearing opening of one web and the bearing opening of the other web aligned in coaxial relation to provide a bearing zone;
   placing a bearing sleeve into the bearing openings; and
   peripherally expanding at least one region of the bearing sleeve to form at least one peripheral expansion sized to project radially into the clearance.

2. The method of claim 1, wherein the at least one peripheral expansion is sized to directly abut at least one of the webs in an axial direction.

3. The method of claim 1, further comprising collaring at least one end of the bearing sleeve so as to project beyond an adjacent one of the webs in the axial direction.

4. The method of claim 3, wherein the expanding and collaring steps are executed at a same time.

5. The method of claim 3, wherein each of the webs forms a form fit with the bearing sleeve when the at least one region is peripherally expanded and the at least one end is collared.

6. The method of claim 1, wherein the bearing opening is formed by a stamping process or boring process.

7. The method of claim 1, wherein the at least one region of the bearing sleeve has a diameter which is greater than a remaining region of the bearing sleeve, with the at least one region of the bearing sleeve extending about the bearing sleeve over its entirety.

8. The method of claim 1, wherein the bearing sleeve is peripherally expanded in the at least one region radially about an entire circumference or intermittently.

9. The method of claim 1, wherein the expanding step includes inserting an expanding mandrel in the bearing sleeve.

10. A chassis control arm, comprising:
    a bearing zone having at least two webs in spaced-apart relation to define a clearance there between, each of the webs having a bearing opening, with the bearing opening of one web and the bearing opening of the other web aligned in coaxial relation; and
    a bearing sleeve received in the bearing openings and having at least one region which is peripherally expanded so as to project radially into the clearance.

11. The chassis control arm of claim 10, wherein the at least one peripheral expansion is formed to directly abut at least one of the webs in an axial direction.

12. The chassis control arm of claim 10, wherein the bearing sleeve has a tubular configuration.

13. The chassis control arm of claim 10, wherein the at least one region of the bearing sleeve has a diameter which is greater than a remaining region of the bearing sleeve.

14. The chassis control arm of claim 10, wherein the at least one region of the bearing sleeve has a fold.

15. The chassis control arm of claim 14, wherein the fold extends in axial or radial extension of the bearing sleeve.

16. The chassis control arm of claim 10, wherein the at least one region of the bearing sleeve has an elevation.

17. The chassis control arm of claim 16, wherein the elevation extends in axial or radial extension of the bearing sleeve.

18. The chassis control arm of claim 10, wherein the webs extend parallel to one another.

19. A vehicle, comprising a chassis control arm including a bearing zone having at least two webs in spaced-apart relation to define a clearance there between, each of the webs having a bearing opening, with the bearing opening of one web and the bearing opening of the other web aligned in coaxial relation; and a bearing sleeve received in the bearing openings and having at least one region which is peripherally expanded so as to project radially into the clearance.

20. The vehicle of claim 19, wherein the at least one peripheral expansion is formed to directly abut at least one of the webs in an axial direction.

21. The vehicle of claim 19, wherein the at least one region of the bearing sleeve has a diameter which is greater than a remaining region of the bearing sleeve.

22. The vehicle of claim 19, wherein the at least one region of the bearing sleeve has a fold or an elevation in axial or radial extension of the bearing sleeve.

* * * * *